though the invention

United States Patent Office 3,431,293
Patented Mar. 4, 1969

3,431,293
AMINO-PHENOL COMPOUNDS
Andrew Robertson, Newcastle-upon-Tyne, England, assignor to Sterling Drug Inc., New York, N.Y.
No Drawing. Filed Apr. 2, 1965, Ser. No. 445,262
Claims priority, application Great Britain, Apr. 9, 1964, 14,821/64
U.S. Cl. 260—474
Int. Cl. C07c *103/12;* A61k *27/00*
2 Claims

ABSTRACT OF THE DISCLOSURE

The present invention provides compounds of the following structural formula:

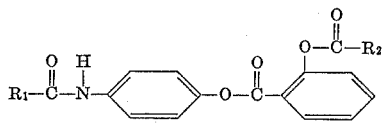

wherein $R_1$ and $R_2$ are lower alkyl groups containing from 1 to 4 carbon atoms.

The invention also provides pharmaceutical compositions comprising a compound of the indicated formula and a non-toxic pharmaceutical carrier therefor. The compounds of the invention exhibit analgesic, anti-inflammatory and antipyretic activity.

---

The present invention relates to new compounds having useful pharmaceutical properties.

The new compounds of the present invention are those having the following structural Formula I:

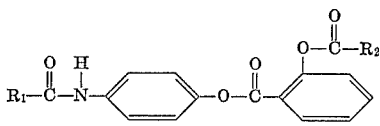

wherein $R_1$ and $R_2$ are lower alkyl groups containing from 1 to 4 carbon atoms.

Suitable alkyl groups for the substituents $R_1$ and $R_2$ include methyl, ethyl, propyl and isopropyl. A preferred compound of the invention is the acetyl salicyclic ester of N-acetyl p-amino phenol which is tasteless and chemically very stable.

The invention further provides pharmaceutical compositions comprising a compound of Formula I and a non-toxic pharmaceutical carrier therefor.

Suitable carriers include all those normally used in pharmaceutical preparations, such as starch and lactose and suitable liquid media.

Flavouring and colouring agents may be added if desired.

The pharmaceutical compositions of the present invention may be formulated into tablets or capsules or into various liquid preparations such as elixirs, susupensions or solutions.

The invention also provides a process for the preparation of the compounds of Formula I which comprises reacting a compound having the following general structural Formula II:

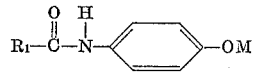

in which M is an alkali metal or an alkaline earth metal atom and is preferably sodium and $R_1$ is a lower alkyl group containing from 1 to 4 carbon atoms with a compound of the following general Formula III:

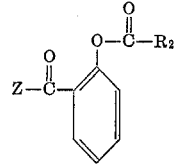

in which Z is a halogen, preferably chlorine, and $R_2$ is a lower alkyl group containing from 1 to 4 carbon atoms.

The reaction is preferably carried out in an inert liquid medium, suitable liquids being water and benzene. The reaction may be carried out at room temperature or at elevated temperatures, suitably under reflux. Towards the end of the reaction the pH of the mixture is checked and, if necessary, adjusted, preferably to a pH of 10 or more. The final product is then allowed to crystallise out and purified by recrystallisation suitably from ethanol or isopropanol.

The process of the invention is illustrated by the following examples:

Example 1

65 gms. of N-acetyl-p-aminophenol were slurried with 400 ml. of water and cooled to 10° C. 125 ml. of 20% sodium hydroxide were slowly added to the mixture with stirring, the temperature being maintained between 10 and 15° C. To the solution obtained, 75 gms. of acetyl salicoyl chloride were added with vigorous stirring over a period of half an hour, the solution being maintained at a temperature of about 10° C. Towards the end of the reaction the pH was checked and adjusted to greater than 10 by the addition of a small amount of 20% sodium hydroxide. After all the acid chloride had been added, vigorous stirring was continued for half an hour during which time the crude product separated out. This product was filtered off, washed thoroughly with water and recrystallised from ethanol.

Example 2

65 gms. of sodium N-acetyl-p-aminophenol were slurried with 500 gms. of dry benzene and 80 gms. of acetyl salicoyl chloride added. The mixture was heated under reflux for four hours and filtered hot. The excess benzene was removed under vacuum and the crude acetyl salicyclic acid ester of N-acetyl-p-aminophenol crystallised from ethanol.

This example may, if desired, be carried out at room temperature since the reaction was also found to proceed slowly at room temperature.

The novel compounds of the present invention exhibit a satisfactory level of analgesic, anti-inflammatory and antipyretic activity as demonstrated in the Randall and Selitto test in rats, the ultraviolet erythema test in guinea pigs and the milk hyperthermia test in rats. The para-N-acetylaminophenyl acetylsalicylate (hereinafter referred to for convenience as Drug A) exhibited activity in all three respects substantially the same as is produced by an identical dose of aspirin.

The acute toxicity of the compounds of the present invention is satisfactorily low and the following table demonstrates the advantages of Drug A compared in relation to an equi-molar mixture of aspirin and para-N-acetylamino phenol referred to in the following table as "M". The table sets out the results of tests on both mice and rats by both oral and intra-peritoneal administration (the latter being identified in the table, for convenience, as "i.p."):

| Test animal | Route of administration | Drug | LD$_{50}$ |
|---|---|---|---|
| Mice | Oral | A | 2,000 mg./kg. |
| Do | do | M | 1,280 mg./kg. |
| Do | I.p | A | 1,255 mg./kg. |
| Do | I.P | M | 762 mg./kg. |
| Rats | Oral | A | Approx. 10,000 mg./kg. |
| Do | do | M | 2,450 mg./kg. |
| Do | I.p | A | 1,830 mg./kg. |
| Do | I.p | M | 600 mg./kg. |

It will be seen from the figures set forth in the table that very much higher doses of Drug A are needed to exhibit any considerable evidence of toxicity as compared with the toxicity of the mixture M.

It is well known that in the administration of salicylate-type drugs there is always a risk of gastric irritation which, in the more extreme cases, leads to internal hemorrhage.

Experiments carried out on rats have shown that Drug A exhibits no sign of gastric damage on the control animals at dosage levels of up to 1125 mg./kg. whereas experiments in which Drug A was replaced by equivalent doses of aspirin or of the above-mentioned mixture M, disclosed significant gastric damage in the rats tested.

From the foregoing experimental data it will be seen that the compounds of the present invention exhibit pharmacological actions which are closely similar to those exhibited by aspirin but have the advantage of a great reduction in the likelihood of gastric damage and, moreover, because of their significantly lower toxicity the compounds of the present invention exhibit an extremely favourable therapeutic ratio.

Whilst the examples hereinbefore set forth illustrate the production of the compounds according to the present invention in which a salicoyl halide is reacted with the salt of the para-acylamino phenol, the compounds of the present invention can readily be made by a simple esterification or ester interchange reaction between the appropriate acyl salicylic acid, ester or acidanhydride and a para-N-acyl amino phenol or an alkali metal or alkaline earth metal salt thereof, the acyl groups, of course, as before having alkyl groups containing from 1 to 4 carbon atoms and preferably being acetyl groups. Particularly in the case where the reaction involves the use of the phenol compound or the salicylic ester, the reaction is preferably carried out in the presence of an esterification promoter; suitable esterification promoters are the halides and oxy-halides of non-metallic elements such as phosphorus.

The following further examples illustrate formulations utilizing the preferred compounds according to the present invention, namely the para-N-acetylaminophenyl acetyl salicylate:

Example 3

In the formulation of tablets, the following composition was made up:

| | Grams |
|---|---|
| Drug A | 0.500 |
| Dicalcium phosphate | 0.045 |
| Lactose B.P. | 0.045 |
| Starch, maize B.P. | 0.120 |
| Talc B.P.C. | 0.015 |
| Magnesium stearate pure B.P. | 0.005 |
| | 0.730 |

The first four ingredients are mixed together and wet granulated in the usual way with 10% starch paste made from a portion of the starch. The granule is dried, broken down through a 16 mesh sieve and talc and magnesium stearate mixed in. Compress on ½" normal concave punches or flat bevelled punches.

Example 4

The example illustrates the production of a suspension of the preferred compounds of the invention, the formulation being as follows:

| | g./litre |
|---|---|
| Drug A | 100 |
| Carbopol 934 | 2.5 |
| Methyl hydroxybenzoate B.P. | 1.0 |
| Propyl hydroxybenzoate B.P. | 0.1 |
| Butyl hydroxybenzoate USP | 0.06 |
| Sorbitol Solution USP | 700.0 |
| Saccharin Sodium USP | 0.1 |
| Sodium Cyclamate N.F. XI. | 1.0 |
| Colour | q.s. |
| Flavour | q.s. |

Distilled Water, sufficient to make 1,000 ml. Each 10 ml. dose contains 1.0 g.

The suspension was produced in the following manner:

The Drug A is finely powdered. The sorbitol solution is mixed with about 400 ml. of the water, the hydroxy benzoates added with stirring. Add the Carbopol 934 slowly while mixing vigorously. Heat to 75° C., add the Drug A and cyclamate. Add sufficient 10% sodium hydroxide to adjust the pH to 6.0–6.5. The suspension will thicken at this stage. Mix for several minutes, cool, add desired flavour and colour, adjust pH to 6.5 with sodium hydroxide solution. Adjust to final volume with distilled water.

The compounds of the present invention may also be readily formulated into suppositories in which, for example, the preferred compound (Drug A) is powdered and sieved to remove all particles larger than 100 mesh in size and the particles are incorporated into a conventional suppository base in molten form and is uniformly incorporated into the base which is thereafter poured into a suitable mold at, for example, a temperature of 40° C. and is thereafter cooled and removed from the mould; suitable suppository formulations contain 50% by weight of Drug A.

The substance referred to under the trade name "Carbopol 934" and utilized in the suspension formulation of Example 4 is a high molecular weight polymer containing a large proportion of carboxyl groups and is manufactured by B. F. Goodrich & Co. of Cleveland, Ohio, United States of America.

I claim:
1. A compound of the following structural formula:

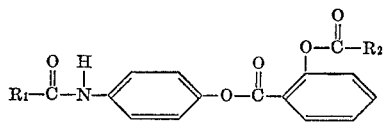

wherein $R_1$ and $R_2$ are lower alkyl groups containing from 1 to 4 carbon atoms.

2. Para-N-acetylaminophenyl acetylsalicylate.

(References on following page)

References Cited

FOREIGN PATENTS 10,260 7/1887 Great Britain.
855,556 10/1960 Great Britain.

OTHER REFERENCES

Groggins: "Unit Processes in Organic Synthesis," 4th ed., McGraw-Hill, N.Y., 1952, pp. 623-4.

Wilson & Jones: "American Drug Index," Lippincott, 1963, pp. 487 and 653.

Mouton et al.: Annales pharm. franc., 1960, 18, pp. 759-62.

Sollmann: "Manual of Pharmacology," 8th ed., Saunders, Philadelphia, 1957, pp. 732, 740, 741.

LORRAINE A. WEINBERGER, *Primary Examiner.*

D. STENZEL, *Assistant Examiner.*

U.S. Cl. X.R.

424—233